US007917759B2

(12) United States Patent
Lal et al.

(10) Patent No.: US 7,917,759 B2
(45) Date of Patent: Mar. 29, 2011

(54) IDENTIFYING AN APPLICATION USER AS A SOURCE OF DATABASE ACTIVITY

(75) Inventors: Amrish K. Lal, Sunnyvale, CA (US); Vivek M. Chandran, Redwood City, CA (US); Ravil A. Desai, Danville, CA (US); Ron-Chung Hu, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 346 days.

(21) Appl. No.: 11/731,071

(22) Filed: Mar. 30, 2007

(65) Prior Publication Data

US 2008/0275843 A1  Nov. 6, 2008

(51) Int. Cl.
*H04L 9/32* (2006.01)
*H04L 29/06* (2006.01)
*G06F 17/30* (2006.01)

(52) U.S. Cl. ............. 713/172; 713/150; 707/783

(58) Field of Classification Search ........... 707/3, 9
See application file for complete search history.

(56) References Cited

U.S. PATENT DOCUMENTS

| 6,088,728 | A * | 7/2000 | Bellemore et al. ............ 709/227 |
|---|---|---|---|
| 6,484,174 | B1 * | 11/2002 | Wall et al. ............................ 707/9 |
| 7,765,585 | B2 * | 7/2010 | Chao et al. ............................ 726/5 |
| 2002/0116647 | A1 * | 8/2002 | Mont et al. ..................... 713/201 |
| 2002/0126701 | A1 * | 9/2002 | Requena ........................ 370/469 |
| 2002/0194482 | A1 * | 12/2002 | Griffin et al. ................... 713/176 |
| 2003/0074580 | A1 * | 4/2003 | Knouse et al. ................. 713/201 |
| 2003/0236975 | A1 * | 12/2003 | Birk et al. ...................... 713/156 |
| 2004/0128546 | A1 * | 7/2004 | Blakley et al. ................ 713/201 |
| 2005/0044398 | A1 * | 2/2005 | Ballinger et al. ............. 713/200 |
| 2006/0015727 | A1 * | 1/2006 | Birk et al. ...................... 713/171 |
| 2006/0041547 | A1 | 2/2006 | Karch |
| 2006/0080352 | A1 * | 4/2006 | Boubez et al. ................ 707/102 |
| 2006/0112081 | A1 | 5/2006 | Qureshi |
| 2006/0248085 | A1 * | 11/2006 | Sack et al. ........................ 707/9 |
| 2007/0136603 | A1 * | 6/2007 | Kuecuekyan ................. 713/185 |
| 2007/0208745 | A1 * | 9/2007 | Ture et al. .......................... 707/9 |
| 2007/0239666 | A1 | 10/2007 | Garcia |
| 2008/0276305 | A1 * | 11/2008 | Chan et al. ........................ 726/5 |

FOREIGN PATENT DOCUMENTS

EP  1443426  8/2004
WO  WO 2007/012799  2/2007

OTHER PUBLICATIONS

Andres Andreu Case Study in Information Security SANS Institute Oct. 30, 2003.*
U.S. Appl. No. 11/133,498, Bromwich et al.
Symantec, Data Sheet: Application Performance Management, Symantec i3™ for J2EE, Performance Management for the J2EE Platform, Aug. 2006.
Oracle, 16 Preserving User Identity in Multitiered Environments, Oracle® Database Security Guide, 10g Release 2 (10.2), Jun. 2005, http://download-east.oracle.com/docs/cd/B19306_01/network.102/b14266/apdvprxy.htm.

* cited by examiner

*Primary Examiner* — Neveen Abel-Jalil
*Assistant Examiner* — Polina Peach
(74) *Attorney, Agent, or Firm* — Hunton & Williams, LLP (57) ABSTRACT

Determining an application user as a source of database activity is disclosed. A communication is received. A thread that is configured to handle the communication is associated with an application user with which the communication is associated. The application user is associated with a database query generated by the thread.

17 Claims, 5 Drawing Sheets

FIG. 5

IDENTIFYING AN APPLICATION USER AS A SOURCE OF DATABASE ACTIVITY

BACKGROUND OF THE INVENTION

A wide variety of entities use a combination of databases and applications that query those databases to provide users with the ability to view and manipulate information. For example, in an electronic commerce context, a merchant may own a database that stores product information such as stock photographs, product descriptions, and price/availability information. Potential customers are able to view this information by visiting the merchant's website and interacting with assorted web pages generated by the merchant's webserver. In an enterprise context, employees might use a customer relationship management (CRM) application to access and/or update customer information stored on CRM databases.

Allowing end-users to interact with databases can be a convenient and efficient way to assure that those users are presented with up-to-date information. Unfortunately, without adequate protections in place, a nefarious individual may be able to employ techniques such as an SQL injection attack to submit malicious queries to a database, such as ones resulting in the exposure of credit card or other confidential information, or the modification of pricing information.

While a traditional security product such as a log analysis tool might be able to reveal that a database attack has taken place, it is typically unable to provide the identity of the person responsible for the attack. One reason for this is that applications typically authenticate themselves to databases using the same set of credentials irrespective of which end-user is interacting with the application. Additionally, the queries generated by a potentially very large number of simultaneous application users may be multiplexed over a relatively small number of database connections, making forensic attempts to correlate different logs difficult.

One approach to determining who is responsible for specific database activity is to modify the application to record that information. Unfortunately, such an approach is intrusive and inefficient, requiring programmers to modify, test, and maintain a potentially cumbersome feature in every database application. And, in the case where the application is supplied by a third party (e.g., as an off-the-shelf product), modifying the application may not be possible.

Another approach is to record the interactions between users and the application (e.g., using a proxy) and then later attempt to correlate literals appearing in those interactions with literals that appear in SQL statements. Unfortunately, it may not be possible to identify the source of a malicious query when multiple SQL statements contain the same literals (e.g., when multiple users carry out similar activity on the application at the same time) or when there are no literals in the SQL statement.

Therefore, it would be desirable to have a better way to determine the origin of database activity.

SUMMARY OF THE INVENTION

Determining an application user as a source of database activity is disclosed. A communication is received. A thread that is configured to handle the communication is associated with an application user with which the communication is associated. The application user is associated with a database query generated by the thread. In some embodiments an indication that the query is associated with the application user is provided to a downstream reader. In some embodiments providing the indication includes generating a dummy query. In some embodiments the dummy query includes an indication that subsequent queries are associated with the application user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a web application server receives a new user request (e.g., from a user "u1"), typically it spawns a thread ("t1") for processing tasks such as executing application modules, business logic, and database statements related to that user request. Web application servers typically have interfaces that can be used to develop a custom module for intercepting all requests and responses to web applications and gaining access to web application session objects, without disturbing existing web applications. In some embodiments, a custom module is configured to obtain the username of (and/or other identity or other information associated with) u1 and associate it with thread t1. Whenever a statement s1 is executed by thread t1, the user and statement can be associated with one another without modifying the application code.

Web applications typically communicate with databases through a database connector which can be wrapped by a custom database connector. When thread t1 calls a function within the custom database connector, the custom database connector can be configured to record the identity of thread t1 and the statement s1 that the thread is executing through the function call. The end-user's username (IP address, etc.) for a particular statement can be sent to a database security monitor using a variety of techniques, and the database security monitor can incorporate the information into its monitoring processes as applicable.

Figure 1:
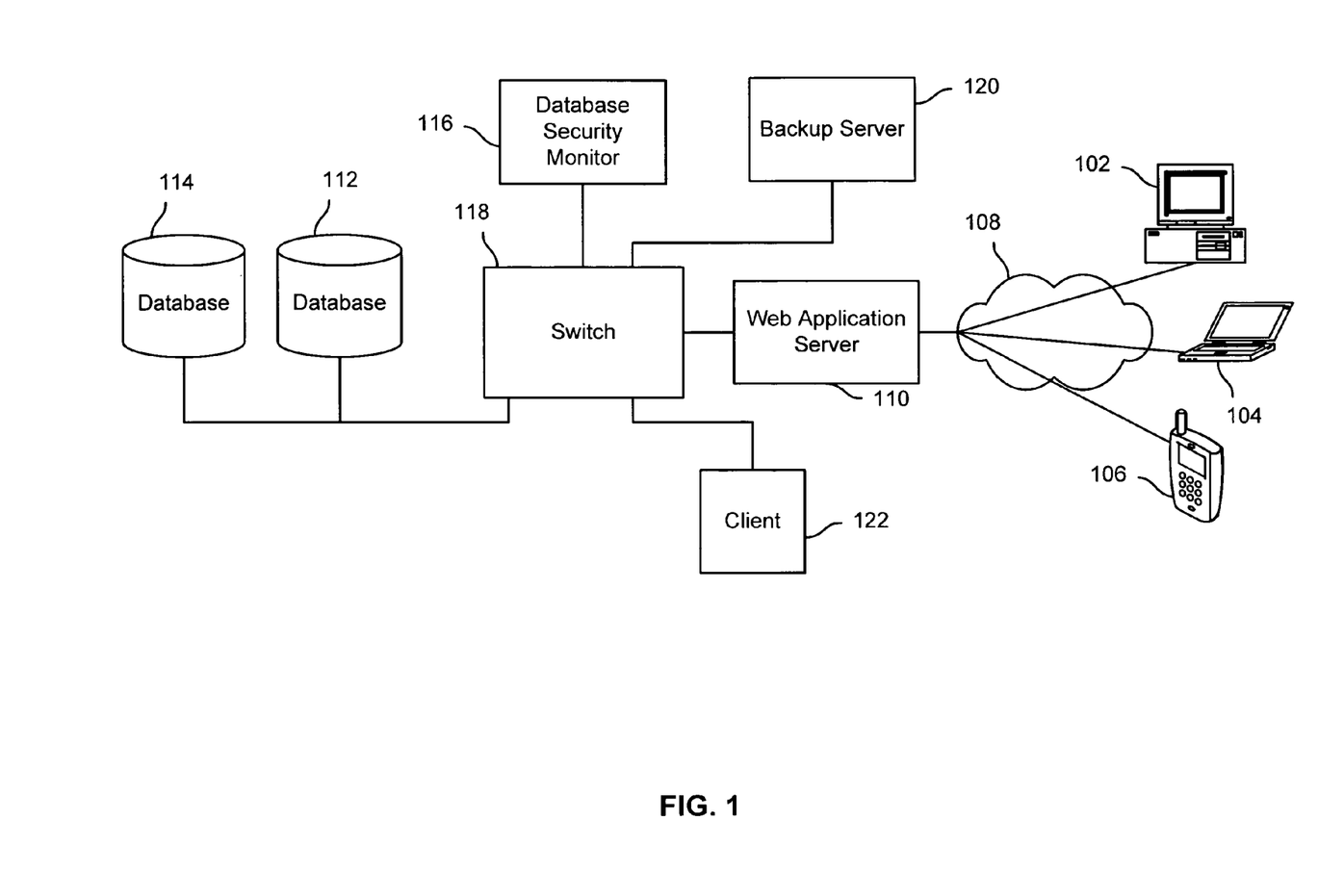
FIG. 1 is a block diagram illustrating an environment having database security.

FIG. 1 is a block diagram illustrating an environment having database security. In the example shown, various web application users 102-106 communicate with a web application server 110 through network 108. As used herein, the term "application user" refers to a user, human or otherwise, of an application that interacts with a database via one or more connections that the database understands to be associated with the application but not necessarily any specific or individual user of the application. In various embodiments network 108 is the Internet, a local area network, a wide area network, or some combination of such networks. Application users may access web application server 110 using a variety of platforms, such as personal computers (e.g., 102), laptops (104), and cellular phones/personal-digital assistants (106), as well as other types of information appliances (not shown) such as set-top boxes, game consoles, broadband routers, and digital video recorders, as applicable.

In the example shown, databases 112 and 114 are networked (via switch 118) and store a collection of information, some of which is confidential (such as credit card numbers and/or salary information). In various embodiments databases 112 and 114 are relational databases (e.g., products such as Oracle Database, IBM DB2, and Microsoft SQL Server), flat-file databases, or a different types of databases and the techniques described herein are adapted accordingly. The environment shown in FIG. 1 may also include a single database instead of a plurality of databases. A database administrator can access databases 112 and 114 using client 122, which is in this example an administrative console.

Web application server 110 executes one or more applications that generate queries to databases such as database 112 and database 114 based on information provided by application users such as application users 102-106. Web application server 110 authenticates itself to database 112 using login/password pair. In various embodiments, other authentication techniques, such as the use of digital certificates are used instead of or in addition to password authentication.

In the example shown, web application server 110 communicates with application users 102-106 using HTTP and queries are formulated in SQL. Other languages or techniques for transferring information (e.g., XML, SOAP, LDAP, SMTP, and message queue) and representing queries may also be used and the techniques described herein adapted as applicable. As described in more detail below, the application(s) receive query results in response and web application server 110 provides them to the appropriate application user.

Database security monitor 116 observes traffic sent between database 112 and web application server 110 such as by using a tap port on switch 118. In various embodiments, other traffic monitoring techniques are used, such as by database security monitor 116 being inline, using a remote switched port analyzer (RSPAN) feature, or using a switched port analyzer (SPAN) feature. In some embodiments database security monitor 116 is configured to recognize legitimate queries based on training. If an anomalous query is observed, the query is logged and other actions may be performed, such as sending an alert to an administrator, blocking execution of the query, etc. As described in more detail below, web application server 110 can be configured to provide database security monitor 116 with information (e.g., user name, IP address, machine name, MAC address, etc.) identifying the origin of database activity.

Other components may be included in the environment such as backup server 120 and firewalls, network intrusion detection systems, etc. (not shown).

Figure 2:
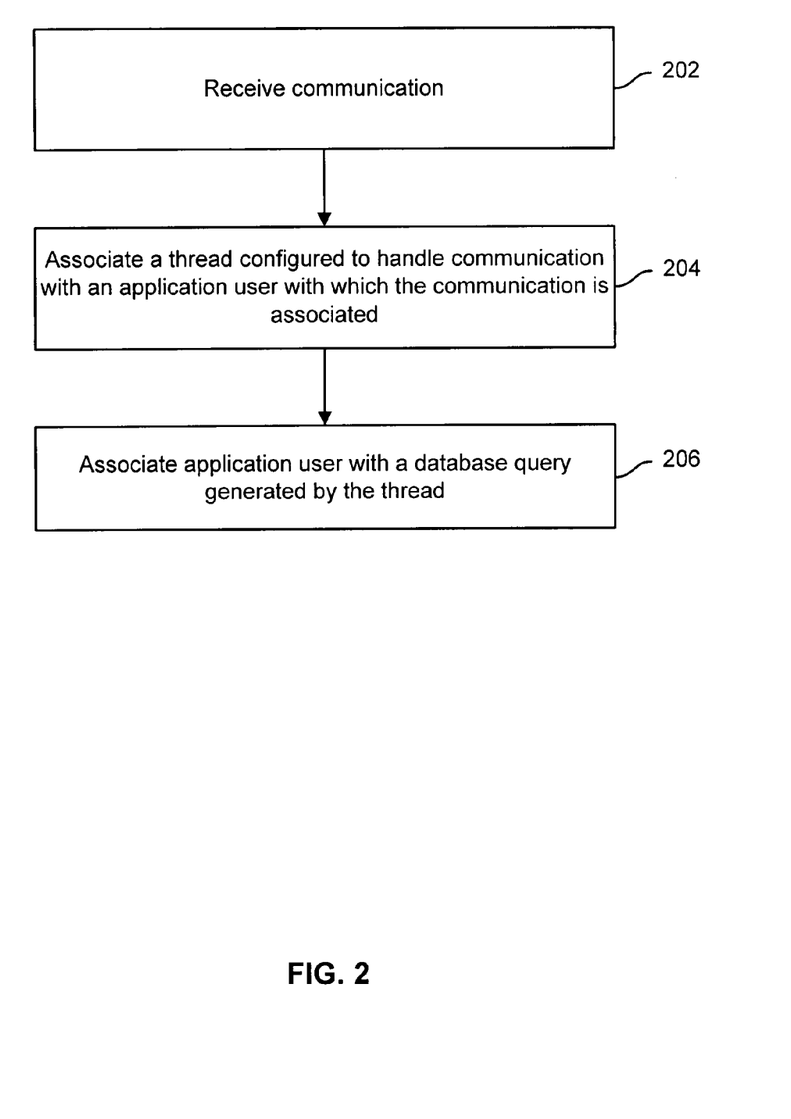
FIG. 2 is a flow chart illustrating an embodiment of a process for determining the origin of database activity.

FIG. 2 is a flow chart illustrating an embodiment of a process for determining the origin of database activity. In some embodiments the process shown in FIG. 2 is performed by web application server 110. The process begins at 202 when a communication is received. Suppose web application server 110 is configured to provide a web browser executing on application user 102's computer with an HTML and/or JavaScript-based form. The web browser displays this form on the application user's computer and the user (e.g., searching for a product) provides input for the field(s) in the form. When the application user presses a submit button, the web browser provides the input to web application server 110. At 202 web application server 110 receives the input (communication).

At 204, a thread configured to handle the communication is associated with the application user with which the communication is associated. For example, when an application user first contacts web application server 110 (e.g., logs in), web application server 110 can be configured to extract the username (and/or other information such as IP address, MAC address, web browser type, host, query string, cookies, etc. hereinafter referred to as "extracted information") of the web application user and then associate the username (and extracted information) with the session object that gets created by the web application server. Whenever a request for a pre-existing session is received, a lookup of the username associated with the session ID of the request can be performed. Web application server 110 can read its thread ID and associate that thread ID with the username. In some embodiments the username is associated with a process (e.g., process ID) rather than or in addition to a thread and the techniques described herein are adapted as applicable. The term "thread" can thus be used interchangeably with "process" herein.

At 206, a database query generated by the thread is associated with the application user with which the processing thread is associated. A web application residing on web application server 110 communicates with a database such as database 112 through a database connector. A request processing thread calls database connector functions to send queries to and receive results from a database. When a request processing thread calls a function within the database connector, the database connector will record the caller thread ID and SQL statement that the thread is executing through the function call. Since the set of SQL statements that a given thread executes is known, and since the web application user associated with the thread is known, the web application user and SQL statements generated by his/her actions can be linked.

As described in more detail below, information denoting the link between a particular web application user and his/her SQL statements can be provided to database security monitor 116 (and any other components configured to make use of the information) in a variety of ways. In some embodiments database security monitor 116 is collocated on database 112, web application server 110 (e.g., as a process), or another component of the environment shown in FIG. 1. Similarly, the username/SQL statement information can be provided to a variety of components in addition to database security monitor 116. In various embodiments, portions of the environment shown are combined or omitted as applicable. For example, client 122 and backup server 120 may be omitted.

Figure 3:
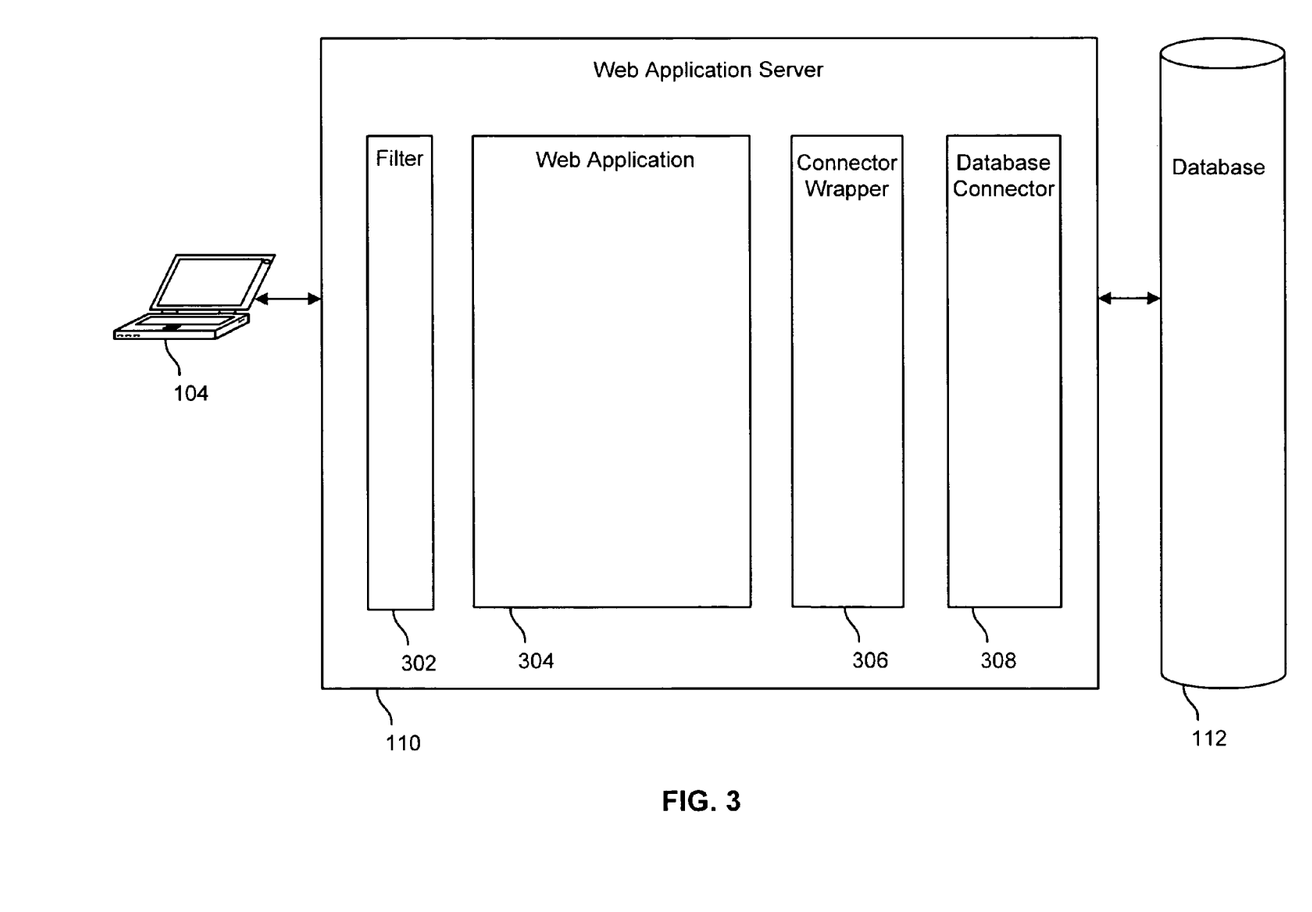
FIG. 3 is a block diagram illustrating an embodiment of a system for determining the origin of database activity.

FIG. 3 is a block diagram illustrating an embodiment of a system for determining the origin of database activity. Web application server 110 includes an interface that can be used to develop a custom module for intercepting all requests and responses to web applications and gaining access to web application session objects, without disturbing existing web applications. In the example shown, web application server 110 runs JBoss Application Server and includes a custom filter 302 that intercepts HTTP requests. In other architectures (e.g., Microsoft IIS), other components may be used to intercept HTTP (or XML, SOAP, etc.) requests as applicable, such as Microsoft ISAPI extensions.

The custom module is configured such that when an application user logs in, the custom module intercepts and parses the request to extract the username and then associates the username with the session object that gets created by web application server 110. The custom module will then store the extracted username along with ID of the created session object in a static memory area. Whenever a request for a pre-existing session is received, the custom module searches its static memory area to lookup the username associated with the session ID of the request. The custom module will also read its own thread ID and associate that thread ID with the username that was looked-up from the static memory area. The username (e.g., "u1") of the application user on whose behalf a given request processing thread is processing tasks can thus be determined.

A web application 304 (e.g., an electronic commerce application) communicates with a database such as database 112 via a database connector such as database connector 308. Request processing threads call database connector functions to send queries to and receive results from database 112. In the example shown, database connector 308 is based on JDBC. In the example shown, a custom connector wrapper 306 sits in between web application 304 and database connector 308. Web application 304 is configured to use connector wrapper 306 which is in turn configured to pass all SQL statements and data through to database connector 308. In various embodiments, web application 304 is provided by a third party and/or its code is not modified. Connector wrapper 306 functions as a wrapper over database connector 308, and in some embodiments does not require any modification of the application.

When a request processing thread (e.g., t1) calls a function within connector wrapper 306, connector wrapper 306 will record the caller thread ID t1 and SQL statement (e.g., s1) that the thread is executing through the function call.

In some cases web application 304 is interactive and transaction oriented, such that web application users expect immediate responses to their requests. In some cases, web application 304 is configured to spawn off threads (e.g., Tx, Ty, Tz) from the main application thread (e.g., T1). Connector wrapper 306 can be configured to observe that when thread Tx executes an SQL statement (e.g., "Sa"), thread Tx is not associated with a username. In such a case, connector wrapper 306 will then step through the Tx thread hierarchy until it reaches the request handler thread T1 which has a username associated with it.

In various embodiments other components sit between web application server 110 and database 112 and the techniques described herein can be adapted to propagate information through those additional components. Thus, in addition to the three-tiered architecture described herein, additional leveled architectures (e.g., four tier) may be used and the techniques described herein adapted accordingly. For example, A SOAP server may be configured in a manner similar to webserver 110 with its own filter hooks and wrappers.

Figure 4:
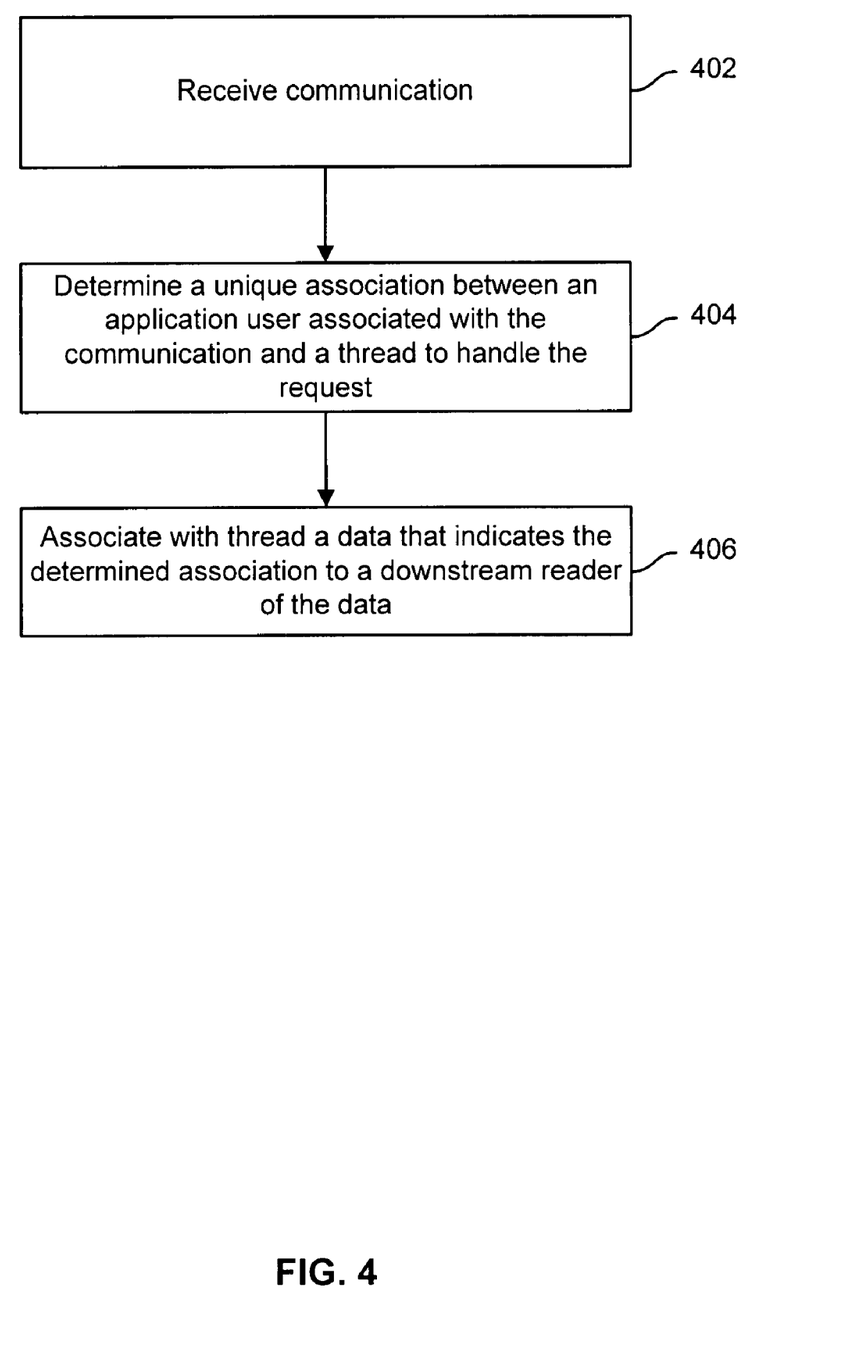
FIG. 4 is a flow chart illustrating an embodiment of a process for determining an association between an application user and a process or thread.

FIG. 4 is a flow chart illustrating an embodiment of a process for determining an association between an application user and a process or thread. The process begins at 402 when a communication is received. As described above in conjunction with portion 202 of FIG. 2, one example of a communication being received includes web application server 110 receiving HTTP communications that include POST/GET methods.

At 404 a unique association between an application user associated with the communication and a thread to handle the request is determined. As described above in conjunction with portion 204 of FIG. 2, web application server 110 can be configured to extract a username from communications.

At 406, the thread has associated with it a datum that indicates the determined association to a downstream reader of the data. For example, at 406, thread local variables may be employed to associate a username and a thread. In various embodiments (e.g., based on architecture) the association may be made in other ways, such as by configuring web application server 110 to store information associating a username and a thread in a log file readable by the downstream reader.

Figure 5:
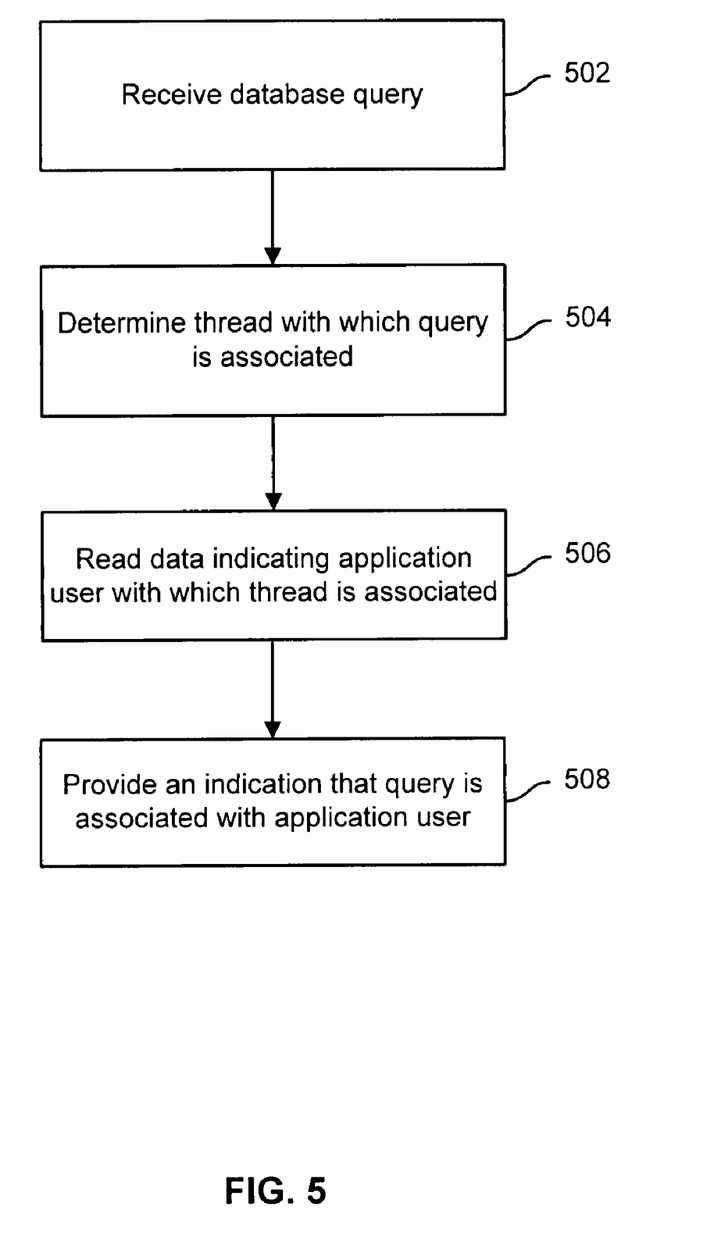
FIG. 5 is a flow chart illustrating an embodiment of a process for providing an indication of the origin of database activity.

FIG. 5 is a flow chart illustrating an embodiment of a process for providing an indication of the origin of database activity. In some embodiments the process shown in FIG. 5 is performed by a connection wrapper, such as connection wrapper 306.

The process begins at 502 when a database query is received. For example, at 502, connection wrapper 306 receives a database query from web application 304. At 504, the thread with which the query is associated is determined. At 506, data indicating the application user with which the thread is associated is read. For example, at 506, wrapper connector 306 makes use of the username stored in a thread local variable at 406 of FIG. 4.

At 508, an indication that the query is associated with an application user is provided. For example, at 508 connector wrapper 306 might modify the query to include a comment that the query is attributable to a particular web application user (and/or provide other information such as the web application user's IP address, MAC address, etc. as name value pairs that can also be extracted when a session is established between a web application user and application server 110). In such a scenario, database 112 would ignore the commented portion of the query, while a module such as database security monitor 116 could be configured to recognize and process the information included in such comments. In some embodiments indications are provided out of band. For example, when connector wrapper 306 forwards the query to database connector 308, connector wrapper 306 could also be configured to send an email that includes the query and associated username, write to a remote log file, etc.

In some embodiments, for reasons such as efficiency and to keep necessary system resources low, the number of simultaneous connections that may be opened between web application server 110 and a database such as database 112 is considerably smaller than the number of application users that may open sessions with web application server 110. For example, while hundreds or thousands of users may be permitted to access web server application server 110 at the same time, web application server 110 may only be permitted to open ten simultaneous connections with database 112. In such a scenario, the indication provided at 508 could include the transmission of a "dummy" query by connector wrapper 306 that indicates that any subsequent queries sent by database connector 308 over a particular connection (e.g., one of the ten connections) are associated with a particular user (until another such dummy message is sent). The dummy queries might be entirely commented so that database 112 ignores them. Database security module 116 could accordingly be configured to monitor database traffic for such dummy queries.

Once provided to database security module 116, the information may be used for a variety of purposes such as by incorporating it in the database security module's profile of normal database activity, using it to improve intrusion detection and auditing functionality, and/or to provide for a more complete feature set. For example, using an interface to database security module 116, and administrator may be able to search anomalies for incidences of a particular user's activity; learn which users have executed particular queries, determine ranges of IP addresses associated with anomalies, etc. When reviewing suspected anomalies, and updating the profile, an administrator may be able to refine the profile with finer granularity such as noting that particular users may or may not execute queries, or that when a threshold number of users perform the same anomalous query that it ought to be automatically whitelisted or blacklisted as appropriate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a web application user as a source of database activity comprising:
    receiving, via a first thread, a communication associated with a web application user, the web application user having authenticated to a web application using a first set of credentials;
    associating a second thread spawned by the web application in response to the communication, with the web application user, wherein the association is based at least in part on mapping a session identifier of the second thread to an identifier associated with the web application user;
    associating the web application user with a database query generated by the second thread, wherein the second thread uses a second set of credentials, that are independent of the web application user and associated with the web application, to access a database for the database query, the database being separate from the web application, wherein associating the web application user with a database query comprises generating a dummy query containing an indicator associated with web application user;
    providing the dummy query to a downstream database security monitor to indicate that the database query is associated with the web application user, wherein the dummy query is ignored by the database, and wherein the dummy query indicates that any subsequent queries received from the web application over the second thread are associated with the web application user; and
    providing an interface for auditing and intrusion detection functionality, wherein the interface allows identification of a user associated with a database anomaly using at least in part the dummy query provided to the downstream database security monitor.

2. The method of claim 1, wherein generating a dummy query includes inserting a comment into the query.

3. The method of claim 1, further comprising sending an email to the downstream database security monitor.

4. The method of claim 1, further comprising providing an indication to the downstream database security monitor by writing to a log file.

5. The method of claim 1 wherein the communication is a request.

6. The method of claim 1 wherein the communication is a request requiring an interaction with a database.

7. The method of claim 1 wherein associating a thread configured to handle the communication with an application user includes using a thread local variable.

8. The method of claim 1 wherein the communication is one of a plurality of communications associated with a transaction.

9. The method of claim 1 wherein associating a thread configured to handle the communication with an application user includes associating the thread with at least one piece of extracted information.

10. A system for determining a web application user as a source of database activity, including:
    a processor; and
    a memory coupled with the processor, wherein the memory is configured to provide the processor with instructions which when executed cause the processor to:
        receive, via a first thread, a communication associated with a web application user, the application user having authenticated to an application using a first set of credentials;
        associate a second thread, spawned by the application in response to the communication, with the web application user, wherein the association is based at least in part on mapping a session identifier of the second thread to the identifier associated with the web application user;
        associate the web application user with a database query generated by the second thread, wherein the second thread uses a second set of credentials, that are independent of the web application user and associated with the web application, to access a database for the database query, the database being separate from the web application, wherein associating the web application user with a database query comprises generating a dummy query containing an indicator associated with web application user;
        provide the dummy query to a downstream database security monitor to indicate that the database query is associated with the web application user, wherein the dummy query is ignored by the database, and wherein the dummy query indicates that any subsequent queries received from the web application over the second thread are associated with the web application user; and
        provide an interface for auditing and intrusion detection functionality, wherein the interface allows identification of a user associated with a database anomaly using at least in part the dummy query provided to the downstream database security monitor.

11. A computer readable medium for storing a computer program of instructions configured to be readable by at least one processor for determining a web application user as a source of database activity, the computer readable medium being embodied in a computer readable medium and comprising computer instructions for:

receiving, via a first thread, a communication associated with a web application user, the web application user having authenticated to a web application using a first set of credentials;

associating a second thread, spawned by the web application in response to the communication, with the web application user, wherein the association is based at least in part on mapping a session identifier of the second thread to the identifier associated with the web application user; and associating the web application user with a database query generated by the thread, wherein the thread uses a second set of credentials, that are independent of the web application user and associated with the web application, to access a database for the database query, the database being separate from the web application, wherein associating the web application user with a database query comprises generating a dummy query containing an indicator associated with web application user;

providing the dummy query to a downstream database security monitor to indicate that the database query is associated with the web application user, wherein the dummy query is ignored by the database, and wherein the dummy query indicates that any subsequent queries received from the web application over the second thread are associated with the web application user; and providing an interface for auditing and intrusion detection functionality, wherein the interface allows identification of a user associated with a database anomaly using at least in part the dummy query provided to the downstream database security monitor.

12. The method of claim 1, wherein the application comprises a middle-tier application.

13. The method of claim 1, wherein determining an application user as a source of database activity is performed without modification to the application.

14. The system of claim 10, wherein the application comprises a middle-tier application.

15. The system of claim 10, wherein determining an application user as a source of database activity is performed without modification to the application.

16. The method of claim 1, wherein the indication provided to the downstream database security monitor is used by the downstream database security monitor to provide intrusion detection and auditing functionality.

17. The system of claim 10, further comprising:
a database security module, the database security module providing functionality allowing restriction of one or more queries of the identified user.

* * * * *